United States Patent
Gazzard

(10) Patent No.: US 8,483,140 B1
(45) Date of Patent: Jul. 9, 2013

(54) INTELLIGENT UPLINK RESOURCE RELEASE CONTROL IN A MOBILE STATION

(75) Inventor: Daryl Robert Gazzard, Alpharetta, GA (US)

(73) Assignee: AT&T Mobiity II LLC, Atlanta, GA (US)

(*) Notice: Subject to any disclaimer, the term of this patent is extended or adjusted under 35 U.S.C. 154(b) by 2252 days.

(21) Appl. No.: 10/856,179

(22) Filed: May 27, 2004

Related U.S. Application Data

(60) Provisional application No. 60/550,613, filed on Mar. 5, 2004.

(51) Int. Cl.
*H04W 4/00* (2009.01)
*H04L 1/00* (2006.01)
*H04L 12/66* (2006.01)

(52) U.S. Cl.
USPC .............................. 370/329; 370/230; 370/352

(58) Field of Classification Search
USPC .......................................... 370/230, 352, 329
See application file for complete search history.

(56) References Cited

U.S. PATENT DOCUMENTS

| | | | |
|---|---|---|---|
| 5,260,943 A | 11/1993 | Comroe et al. | |
| 6,014,087 A * | 1/2000 | Krishnakumar et al. | 710/240 |
| 6,049,715 A | 4/2000 | Willhoff et al. | |
| 6,473,411 B1 | 10/2002 | Kumaki et al. | |
| 6,842,441 B2 | 1/2005 | Balogh et al. | |
| 6,907,019 B2 | 6/2005 | Kotzin et al. | |
| 6,944,459 B2 * | 9/2005 | Parantainen et al. | 455/452.1 |
| 7,082,301 B2 | 7/2006 | Jagadeesan et al. | |
| 7,092,716 B2 | 8/2006 | Nizri et al. | |
| 7,110,366 B2 * | 9/2006 | Hulyalkar et al. | 370/252 |
| 7,389,111 B2 | 6/2008 | Petrus | |
| 2001/0026546 A1 * | 10/2001 | Schieder et al. | 370/338 |
| 2003/0072267 A1 * | 4/2003 | Lohtia et al. | 370/252 |
| 2004/0033805 A1 | 2/2004 | Verma et al. | |
| 2004/0038697 A1 | 2/2004 | Attar et al. | |
| 2004/0095905 A1 | 5/2004 | Pecen et al. | |
| 2004/0097233 A1 | 5/2004 | Pecen et al. | |
| 2005/0047370 A1 | 3/2005 | Kotzin et al. | |
| 2006/0165027 A1 * | 7/2006 | Heden | 370/328 |

* cited by examiner

*Primary Examiner* — Christopher M Brandt
*Assistant Examiner* — Muthuswamy Manoharan
(74) *Attorney, Agent, or Firm* — Parks IP Law LLC; Mickki D. Murray Esq.

(57) ABSTRACT

A mobile station for transferring delay-sensitive data to a wireless communications network is provided with an uplink resource release controller that selectively inhibits release of an uplink resource in order to meet requirements of a delay-sensitive data application, such as a VoIP or streaming application. In one embodiment, the uplink resource release controller causes dummy blocks to be written to a data buffer to prevent initiation of a countdown process. By intelligently controlling resource release, delay-sensitive data may be transmitted in a more reliable fashion, thereby increasing application performance.

24 Claims, 4 Drawing Sheets

INTELLIGENT UPLINK RESOURCE RELEASE CONTROL IN A MOBILE STATION

CROSS-REFERENCE TO RELATED APPLICATION

This application claims the benefit of U.S. Provisional Application No. 60/550,613 by Daryl Robert Gazzard, filed Mar. 5, 2004 and entitled "Systems and Methods of Providing Intelligent Application Resource Handling for Delay Sensitive Data Applications." The disclosure of the foregoing application is incorporated herein by reference.

BACKGROUND

1. Field of the Invention

The present invention relates generally to data communications in a wireless communication system, and more particularly, to systems and methods for controlling the allocation and release of uplink resources in connection with the transmission of data produced by delay-sensitive applications.

2. Description of the Prior Art

In today's wireless communications environment, data applications have become commonplace and widely used. Certain of these data applications, such as real-time and streaming applications, are delay sensitive and have very strict requirements with respect to transfer data rate and jitter. If these requirements are not met, the performance of the application may degrade substantially, leading to (for example) interruptions of, or dropouts in, audio or video streams. However, the majority of existing wireless data transmission technologies, such as GSM/GPRS, do not adapt the transmission process to accommodate the requirements of delay-sensitive applications.

The problem associated with transmission of data produced by a delay-sensitive application in a standard communications environment such as GSM/GPRS may best be understood with reference to FIGS. 1 and 2. Generally described, a delay-sensitive data application 102 executing in a mobile station (MS) 100 or in a computer connected to MS 100 generates a flow of data that is representative, for example, of an audio or video stream. The data passes through one or more protocol layers (such as an Real-Time Protocol/User Datagram Protocol/Internet Protocol (RTP/UDP/IP) layer 104 and logical link control (LLC) layer 106), which perform packetization, formatting and control functions, and arrives at data buffer 110 in radio link control/media access control (RLC/MAC) layer 108, where it is stored as data blocks for subsequent transmission to a base station system (BSS) 114.

FIG. 2 depicts the process by which data held in data buffer 110 is transmitted to BSS 114. First, MS 100 must request and be granted an uplink resource by BSS 114. Once the uplink resource is allocated, MS 100 may begin transmitting data blocks enqueued in data buffer 110. In order to allow efficient sharing of the uplink resource, the resource must be released by MS 100 when all of the data blocks in data buffer 110 have been transmitted. In the GPRS specification, uplink resource release is implemented by initiating a countdown process when the number of remaining data blocks enqueued in data buffer 100 falls below a predetermined limit. Once the countdown process has been initiated, each data block is tagged with a countdown value (CV) equal to the number of remaining data blocks, such that the CV for each successively transmitted data block is decremented by one. When BSS 114 receives a data block having a CV equal to zero, it releases the uplink resource. Once initiated, the countdown process proceeds inexorably to completion even if data application 102 has generated additional data during the countdown period, i.e., once the CV has been set, no new data blocks can be enqueued for transmission during the ongoing active transmission period.

After the countdown process has been completed and the uplink resource has been released, MS 100 must again request and be granted the uplink resource. In this manner, transmission of data generated by data application 102 may involve multiple resource allocation/release cycles. Since the resource allocation process can take a substantial period of time (particularly if the resource is heavily utilized), the occurrence of multiple resource allocation/release cycles during a session can introduce operationally significant delays in data transmission, leading to degradation of the performance of the delay-sensitive data application.

SUMMARY

Roughly described, an embodiment of the invention provides a mobile station (MS) for transferring data to a wireless communication network, which includes an uplink resource release controller ("controller") configured to control release of an uplink resource in accordance with the requirements of a delay-sensitive data application, which may execute either on the MS or on a computing device connected to the MS. The delay-sensitive data application, which may take the form of (for example) a Voice-over-IP (VoIP) or streaming application, generates a flow of data that is stored as data blocks in a data buffer for transmission to the network. The controller includes logic for determining whether resource release procedures utilized by the network should be selectively inhibited. The controller may accept as input any number of fixed and/or measured parameters, including without limitation data transfer rates required by the data application, historical delay data for upstream resource allocation, data buffer states, and data flow and transmission rates. In the event that the controller determines that release of the upstream resource will have an adverse effect on application performance, it executes actions to prevent release of the resource. In one example, the controller prevents release by causing dummy blocks to be written to the data buffer, thereby preventing the buffer from emptying to the point where the countdown process will be initiated. The controller may be implemented in any suitable form, including a software layer or application programming interface.

DETAILED DESCRIPTION OF PREFERRED EMBODIMENTS

Figure 1:
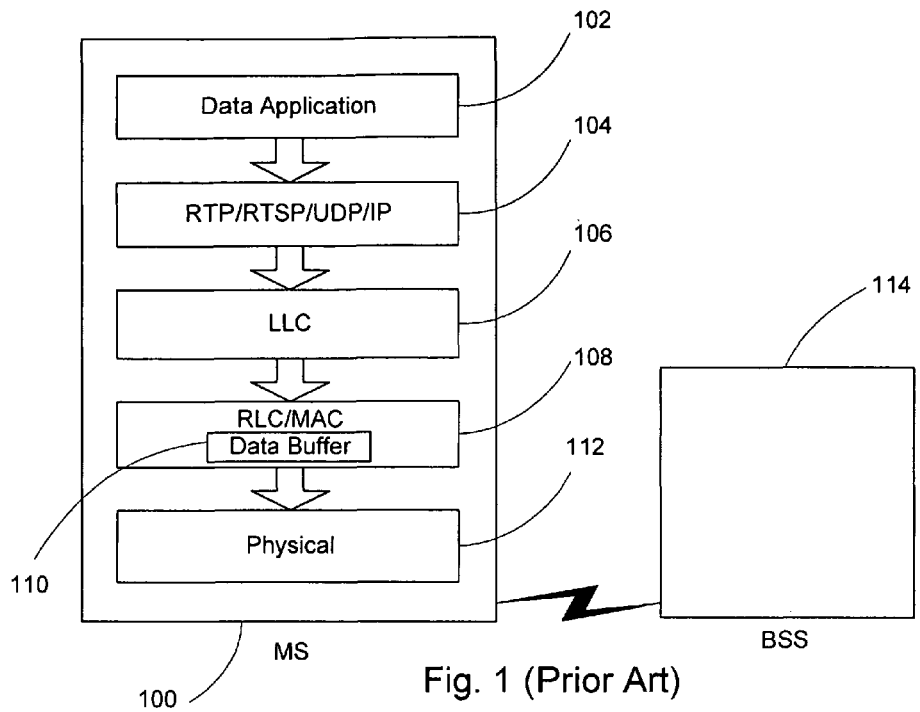
FIG. 1 is a conceptual block diagram illustrating a prior art communications system wherein data is transmitted over a wireless link, showing in particular components of a mobile station.
Figure 2:
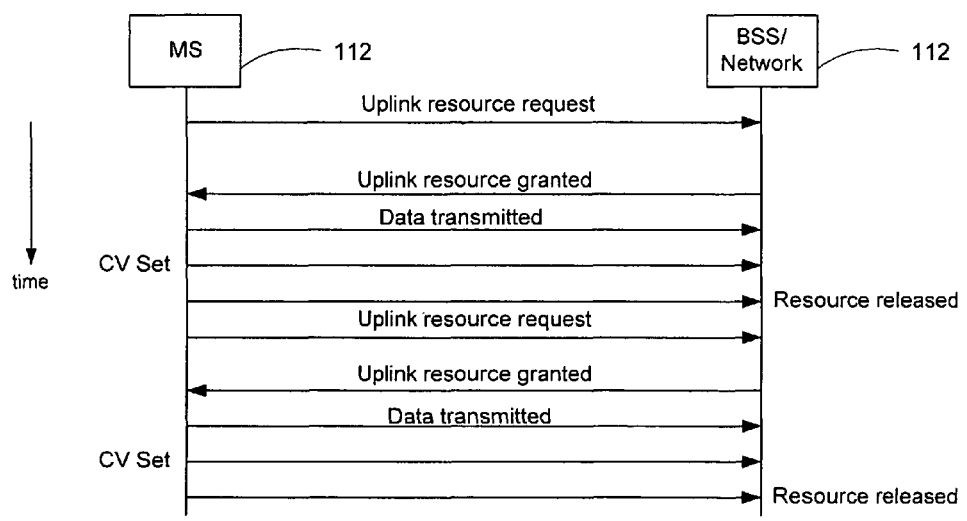
FIG. 2 illustrates the temporal sequence of steps for allocating and releasing an uplink resource, in accordance with the prior art.
Figure 3:
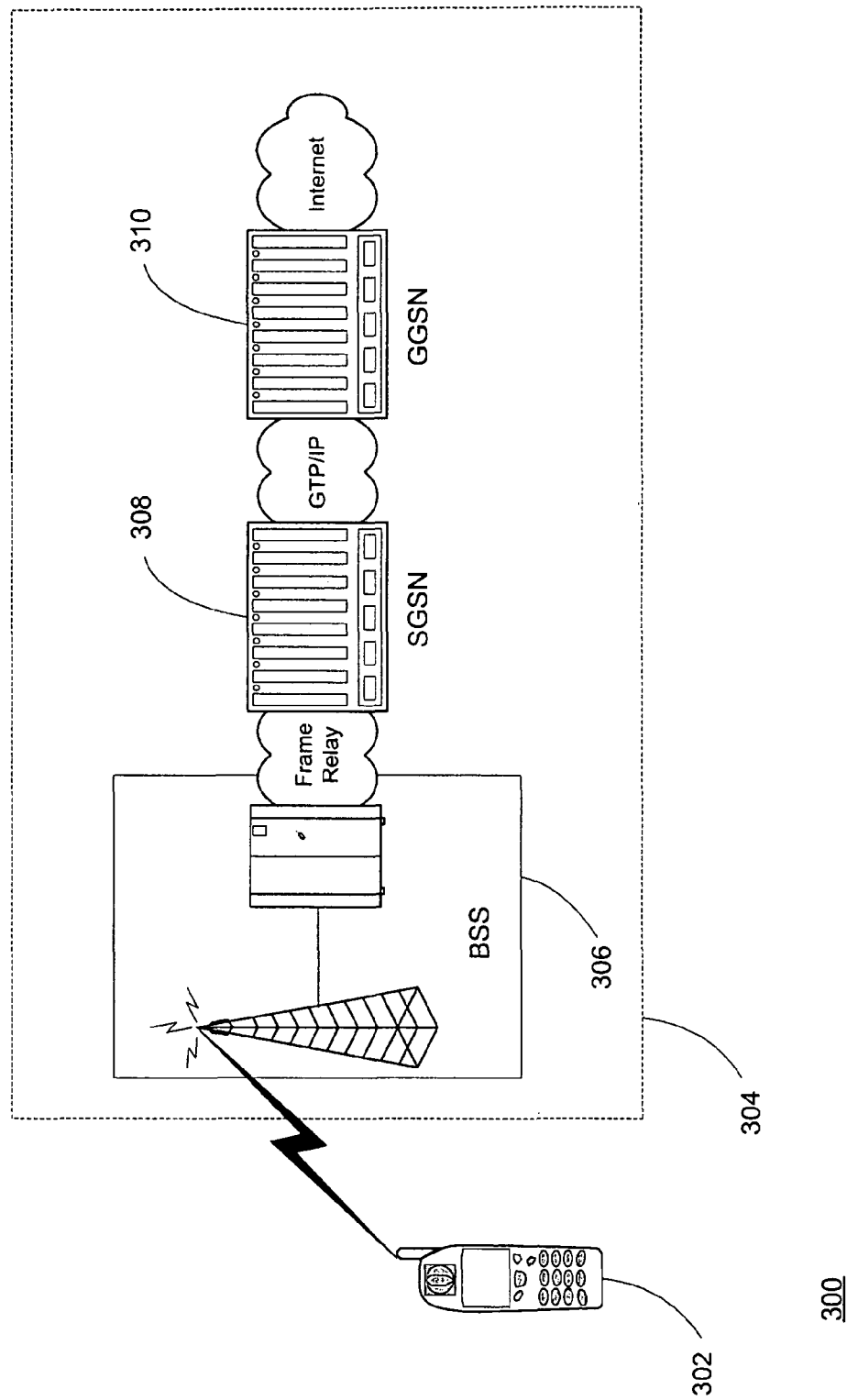
FIG. 3 is a conceptual block diagram showing components of a conventional GSM/GPRS system in which embodiments of the present invention may be implemented.

FIG. 3 depicts functional components of a GSM/GPRS wireless communications system 300 in which an embodiment of the present invention may be implemented. A mobile station (MS) 302 transmits and receives voice and data communications to and from network 304 over a wireless connection. MS 302 may be any suitable device used to access network services over a wireless link, including without limitation, a mobile handset or a laptop computer equipped with a GPRS card. Network 304 includes a base station subsystem (BSS) 306, which is conventionally made up of a base station controller and one or more base transceiver stations. BSS 306 sends data traffic over a frame relay backbone to a serving gateway support node (SGSN) 308, which routes the data traffic to a global gateway support node (GGSN) 310 over GTP/IP. GGSN 310 is in turn connected to the Internet. Using this architecture, data generated by MS 302 may be sent to and received from any other device accessible over the Internet.

While embodiments of the present invention are described herein with reference to their implementation in a conventional GSM/GPRS system, it should be appreciated that the invention may be implemented in connection with any number of wireless data communication technologies, including without limitation Cellular Digital Packet Data (CDPD), Universal Mobile Telecommunications System (UMTS), WLAN, EDGE, and 3G data. Furthermore, while the invention is described and depicted in the context of wireless communications made between a mobile station and a fixed infrastructure network, the invention may also be applied to peer-to-peer communications, i.e., communications which take place directly between two mobile stations.

Figure 4:
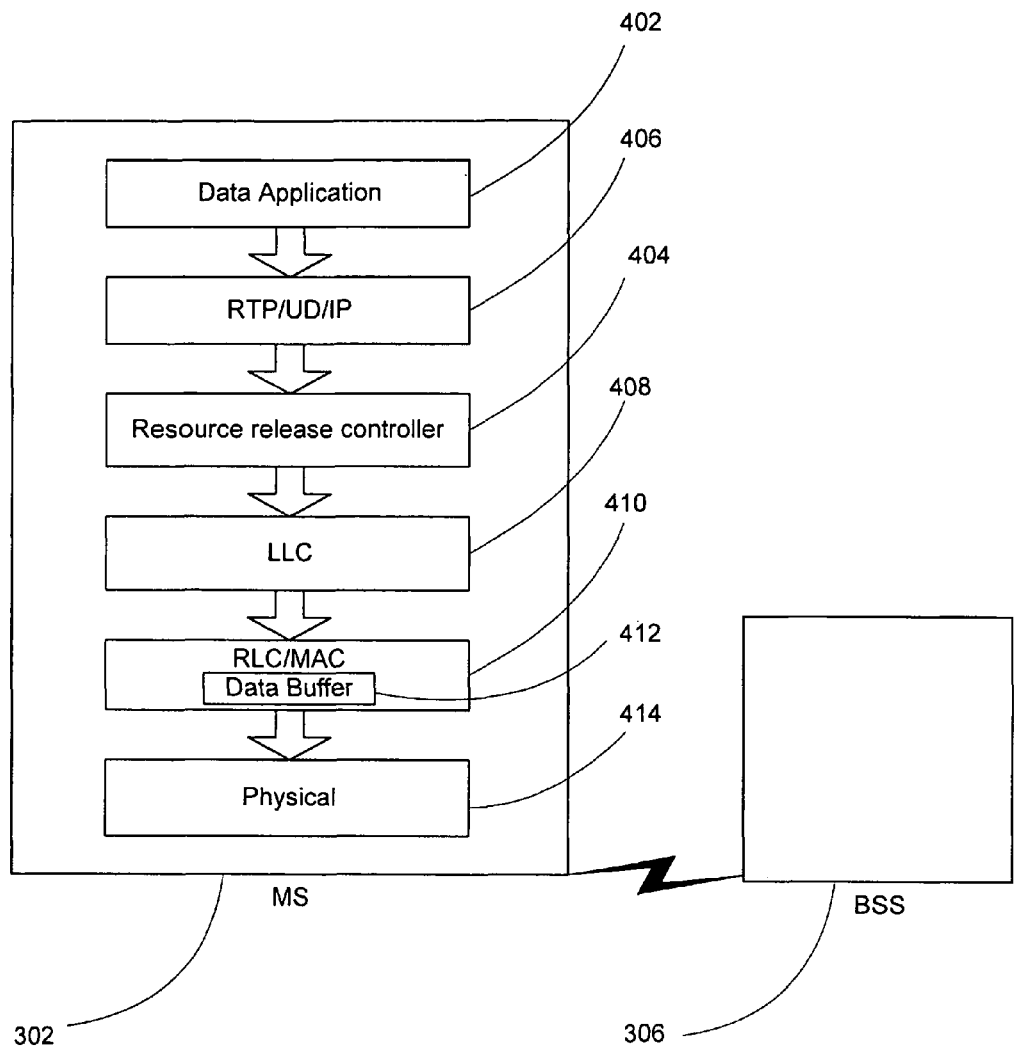
FIG. 4 is a conceptual block diagram illustrating a communications system wherein data is transmitted over a wireless link in accordance with an embodiment of the invention, showing in particular components of a mobile station.

FIG. 4 depicts software layers residing on MS 302, in accordance with one embodiment of the invention. The software layers each contain sets of instructions for performing prescribed functions, and are executable on one or more processors disposed in or coupled to MS 102. The software layers include at the topmost extent at least one data application 402. For the purpose of explication, data application 402 is assumed to be a delay-sensitive application, meaning that it generates data having a temporal aspect, and that delays in the transmission and delivery of the data to its intended recipient can cause degradation in performance. By way of example, data application 402 may take the form of a VoIP application, a peer-to-peer application, or an audio/video streaming application. It is noted that data application 402 need not necessarily reside and be executed on MS 302; in an alternative configuration, data application 402 may reside and be executed on a computing device that is connected to an MS through an appropriate interface.

Data application 402 generates a flow of data (encoding, for example, speech or an audio/video stream), which is passed through a protocol stack that assembles the data produced by data application into discrete units having a prescribed length and format (referred to herein as "data blocks"), performs all necessary encoding, and attaches control and error recovery information. A conventional protocol stack may include an RTP/UDP/IP layer 406, an LLC layer 408, and an RLC/MAC layer 410. The function and operation of these layers are known in the art and need not be discussed herein. The lowermost physical layer 414 corresponds to the physical radio connection over which data is sent from MS 302 to BSS 306.

As described above, in GPRS systems the uplink resource release procedure is initiated when the number of remaining data blocks in the data buffer is less than a predetermined value, referred to in the GPRS protocol as the BS_CV_MAX. Following initiation of the countdown procedure, each transmitted data block is assigned a CV equal to the number of remaining data blocks in the data buffer. Network 304 releases the uplink resource when it receives a data block having a CV equal to zero, denoting that no remaining data blocks are to be transmitted. The GPRS protocol specifies that once the countdown procedure has been initiated, MS 302 cannot enqueue any new data blocks, i.e., it cannot send any data blocks that were not in the transmission queue at the time the countdown procedure was commenced. In accordance with a preferred embodiment, MS 302 is provided with an uplink resource release controller ("controller") 404 that intelligently determines whether release of the uplink resource will cause an unacceptable delay, and, if it so determines, prevents initiation of the countdown procedure that terminates in resource release. Controller 404 is provided with appropriate logic for making the resource release determination based on various inputs, which may include application requirements, data flow rates, transmission rates, data buffer states and estimated resource allocation times. Exemplary application requirements may include implied human behavior (e.g., pressing a button/silence suppression, or voice activity), or be based on parameters passed while establishing a session or buffer states. The operation of controller 404 will be discussed in further detail below in connection with the FIG. 5 flowchart.

While controller 404 is depicted herein as a software layer which sits between RTP/UDI/IP 406 and LLC 408, those skilled in the art will recognize that controller 404 may be alternatively implemented in any number of forms, including without limitation) as an ASIC or other integrated circuit. It should be further recognized that the functional components of controller 404 may alternatively be integrated into data application 402 or into one or more layers of the protocol stack.

Figure 5:
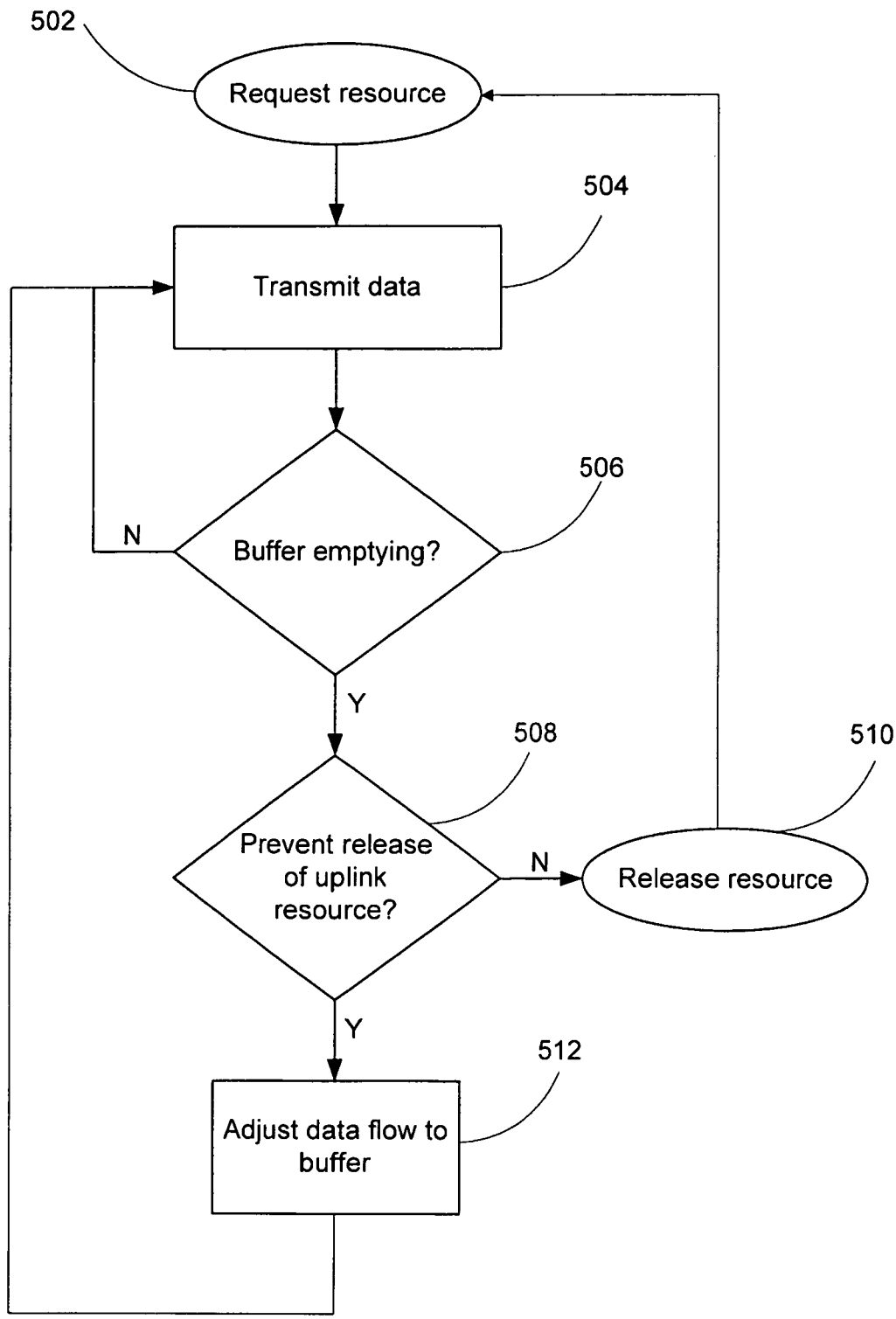
FIG. 5 is a flowchart depicting steps of a method for intelligently controlling uplink resource release, in accordance with embodiments of the invention.

FIG. 5 is a flowchart depicting a process for controlling (e.g., by selectively inhibiting) release of an uplink resource, in accordance with embodiments of the invention. The process depicted in the FIG. 5 flowchart is described with reference to its execution by MS 302 and network 304, but is not intended to be limited thereto.

In the initial step 502, MS 302 requests and is granted an upstream resource. The procedure by which MS 302 requests and BSS 306 grants an uplink resource (alternatively referred to herein as the resource allocation procedure) is defined in the relevant (e.g., GPRS) protocol.

Once the uplink resource has been granted, MS 302 can begin to transmit data that was generated by data application 402, step 504. During active transmission periods (after the uplink resource has been allocated and prior to initiation of the countdown procedure), data generated by data application 402 is assembled into blocks and enqueued for transmission in data buffer 412. RLC/MAC layer 410 manages transmission of data to BSS 306 via physical layer 414. Thus, data blocks are transmitted from the top of the queue and newly generated data blocks are added to the bottom of the queue. However, in the event that data application 402 stops generating new data, or if the rate at which data blocks are transmitted to the network substantially exceeds the rate at which new data blocks are added to data buffer 412, data buffer 412 will start to empty, as described below.

In step 506, controller 404 determines whether data buffer 412 is emptying, i.e., whether the number of remaining data blocks is approaching a number that will trigger initiation of the countdown process. This step may involve real-time monitoring of data buffer state information (i.e., whether data blocks are being transmitted and the number of data blocks currently enqueued). Alternatively and/or additionally, controller 404 may detect or predict emptying of data buffer 412 using measurements or estimates of data flow rates generated by data application 402 and rates of transmission of data blocks from data buffer 412. Because the countdown process, once initiated, will invariably lead to release of the uplink resource, it is critical that controller 404 detects emptying of data buffer 412 and takes suitable action for preventing resource release (if deemed appropriate in step 508, described below) prior to setting of the CV and commencement of the countdown process. If controller 404 determines that data buffer 412 is not emptying, then process returns to transmitting data blocks, step 504. Those skilled in the art will recognize that step 506 will be performed concurrently (either on a continuous or periodic basis) with the transmission step 504.

If controller 404 determines that data buffer 412 is emptying, then in step 508, it determines if the release of the uplink resource should be allowed or prevented. The basis for this determination is whether release of the resource (and the consequent necessity of reallocating the uplink resource to MS 302) will result in unacceptable delays in the delivery of data generated by data application 402 to the recipient. Controller 404 analyzes various inputs provided by MS 302 and/or BSS 306 and the associated network 304 to make its determination. These inputs may include, without limitation, data transfer rates required by the data application 402, present data flow and transmission rates, application state data, delay times associated with upstream resource allocation (provided or measured by either MS 302 or BSS 306), the availability of extended uplink release or other protocols, and an indication as to whether a downlink resource has been allocated to MS 302.

One factor which may be used by controller 404 to determine if the uplink resource release should be prevented is whether a natural break in the flow of data generated has occurred. A natural break is a temporary or permanent cessation of data flow associated with certain events or conditions that occur during normal operation of data application 402. For example, a natural break may occur in a VoIP application when the MS 302 user has stopped speaking. Data application 402 may alert controller 404 that a natural break has occurred by setting an appropriate flag; alternatively controller 404 may monitor other aspects of data application 402 operation to detect natural breaks. In some situations and in certain data applications, a natural break will have an associated duration sufficient to permit release of the uplink resource without adversely affecting the performance of data application 402.

Controller 404 is configured with logic that encodes a set of rules for intelligently determining from analysis of its inputs whether release of the uplink resource should be allowed or prevented. Implementations of these rules will be apparent to those skilled in the art in view of the considerations of data application 402 and network 304 performance. Generally speaking, uplink resource release should be inhibited where necessary to meet data application 402 data transfer requirements; however, excessive inhibition of uplink resource release will reduce the availability of the shared resource to other mobile stations, thereby adversely affecting overall network performance.

If controller 404 determines that release of the uplink resource should be allowed, it refrains from taking action to inhibit release, and data buffer 412 will empty to the point where the countdown procedure has been initiated, step 510. If, after the countdown procedure has been initiated, additional data is generated by data application 402, MS 302 must request and be granted the uplink resource (following resource release) before the additional data can be transmitted to BSS 306, per step 502.

In the event that controller 404 determines that uplink resource release should be prevented, it takes appropriate action to prevent release, step 512. In accordance with one implementation, controller 404 inhibits release by adjusting the data flow into data buffer 506 in order to stop it from emptying to the point of countdown initiation. This task may be accomplished, for example, by writing (or causing the writing of) dummy blocks to data buffer 412. Dummy blocks do not contain any useful information and may be disregarded by network 304 and/or the recipient. However, their presence within the data buffer 412 queue prevents data buffer 412 from emptying to the point where the countdown procedure is initiated, thereby preventing release of the resource.

Those skilled in the art will recognize that various alternative methods may be available for preventing uplink resource release. The dummy block insertion method outlined above is presented by way of an illustrative example, and the invention should not be construed as being limited to that or any other method as the sole means for inhibiting release. Another example for preventing uplink resource release is MS 302 skipping allocated uplink slots (i.e., not sending a few allocated blocks) to throttle the data flow into network 304 and to allow buffer 412 to fill up a little.

After adjusting the data flow to data buffer 412 or taking another action which inhibits release of the uplink resource, the process loops back to the transmitting step 504. It should be recognized that although the FIG. 5 flowchart depicts steps 502-512 as occurring in sequence, certain of the steps may be performed concurrently, as discussed above in connection with steps 504 and 506.

It will be recognized by those skilled in the art that, while the invention has been described above in terms of preferred embodiments, it is not limited thereto. Various features and aspects of the above invention may be used individually or jointly. Further, although the invention has been described in the context of its implementation in a particular environment and for particular applications, those skilled in the art will recognize that its usefulness is not limited thereto and that the present invention can be beneficially utilized in any number of environments and implementations.

What is claimed is:

1. A mobile station for transferring data to a wireless communications network, comprising:
   a data buffer in which data generated by a data application is stored as data blocks for transmission to the network; and
   an uplink resource release controller configured to monitor the data application to determine whether release of the uplink resource will adversely affect performance of the data application, wherein if the uplink resource controller so determines, the uplink resource release controller executes an action to inhibit release of the uplink resource by preventing the data buffer from emptying.

2. The mobile station of claim 1, wherein the uplink resource release controller causes dummy blocks to be written to the data buffer in order to inhibit release of the uplink resource.

3. The mobile station of claim 1, wherein the uplink resource release controller determines whether release of the uplink resource should be inhibited based at least partially on whether a break in data generated by the data application is determined to be a natural break.

4. The mobile station of claim 1, wherein the uplink resource release controller determines whether release of the uplink resource should be inhibited based at least partially on a network parameter.

5. The mobile station of claim 4, wherein the at least one network parameter includes a time required by the network to allocate the uplink resource.

6. The mobile station of claim 4, wherein the at least one network parameter includes an indication of whether the network supports an extended uplink protocol.

7. The mobile station of claim 4, wherein the at least one network parameter includes an indication of whether the mobile station has been allocated a downlink resource.

8. The mobile station of claim 1, wherein the resource release controller determines whether release of the uplink resource should be inhibited based at least partially on operational parameters relating to delay sensitivity provided by the data application.

9. The mobile station of claim 1, wherein the data application is a voice-over-IP (VoIP) application.

10. The mobile station of claim 1, wherein the data application is a streaming application.

11. The mobile station of claim 1, wherein the data application-is a peer-to-peer application.

12. The mobile station of claim 1, wherein the wireless communications network is a GSM/GPRS/EDGE network.

13. The mobile station of claim 1, wherein the uplink resource controller determines that release of the uplink resource will adversely affect performance of the data application at least partially based upon analysis of at least the data transfer rate required by the application and the current data transmission rate between the network and the mobile station.

14. A method for transferring data from a mobile station to a wireless communications network, comprising:
   generating data from a data application;
   storing the data as data blocks in a data buffer in the mobile station for transmission to the network;
   requesting an uplink resource;
   transmitting the data from the mobile station using the uplink resource;
   monitoring the number of data blocks in the data buffer to determine whether to initiate release of an uplink resource;
   determining whether release of the uplink resource will adversely affect performance of the data application; and
   if so determined, executing an action to inhibit release of the uplink resource by preventing the data buffer from emptying.

15. The method of claim 14, wherein the step of executing an action to inhibit release of the uplink resource includes causing dummy blocks to be written to the data buffer.

16. The method of claim 14, wherein the step of determining whether release of the uplink resource should be inhibited includes considering whether a break in data generated by the data application is a natural break.

17. The method of claim 14, wherein the step of determining whether release of the uplink resource should be inhibited includes analyzing at least one network parameter.

18. The method of claim 17, wherein the at least one network parameter includes a time required by the network to allocate the uplink resource.

19. The method of claim 17, wherein the at least one network parameter includes an indication of whether the network supports an extended uplink release protocol.

20. The method of claim 17, wherein the at least one network parameter includes an indication of whether the mobile station has been allocated a downlink resource.

21. The method of claim 14, wherein the step of determining whether release of the uplink resource should be inhibited includes analyzing operational parameters relating to delay sensitivity provided by the data application.

22. The method of claim 14, wherein the uplink resource controller determines that release of the uplink resource will adversely affect performance of the data application at least partially based upon analysis of at least the data transfer rate required by the application and the current data transmission rate between the network and the mobile station.

23. A telecommunications system capable of transferring data, comprising:
   a wireless network including an uplink resource for data transmission; and
   at least one mobile station, comprising:
      a data buffer in which data generated by a data application is stored as data blocks for transmission to the network, the number of data blocks in the data buffer being monitored by the mobile station to determine whether to initiate release of the uplink resource; and
      an uplink resource release controller that monitors the data application to determine whether release of the uplink resource will adversely affect the performance of the data application and, if so determines, executes an action to inhibit release of the uplink resource by preventing the data buffer from emptying.

24. The telecommunications system of claim 23, wherein determining comprises determining, by analyzing at least the data transfer rate required by the application and the current data transmission rate between the network and the mobile station, whether release of the uplink resource will adversely affect performance of the data application.

* * * * *